Patented Sept. 6, 1932

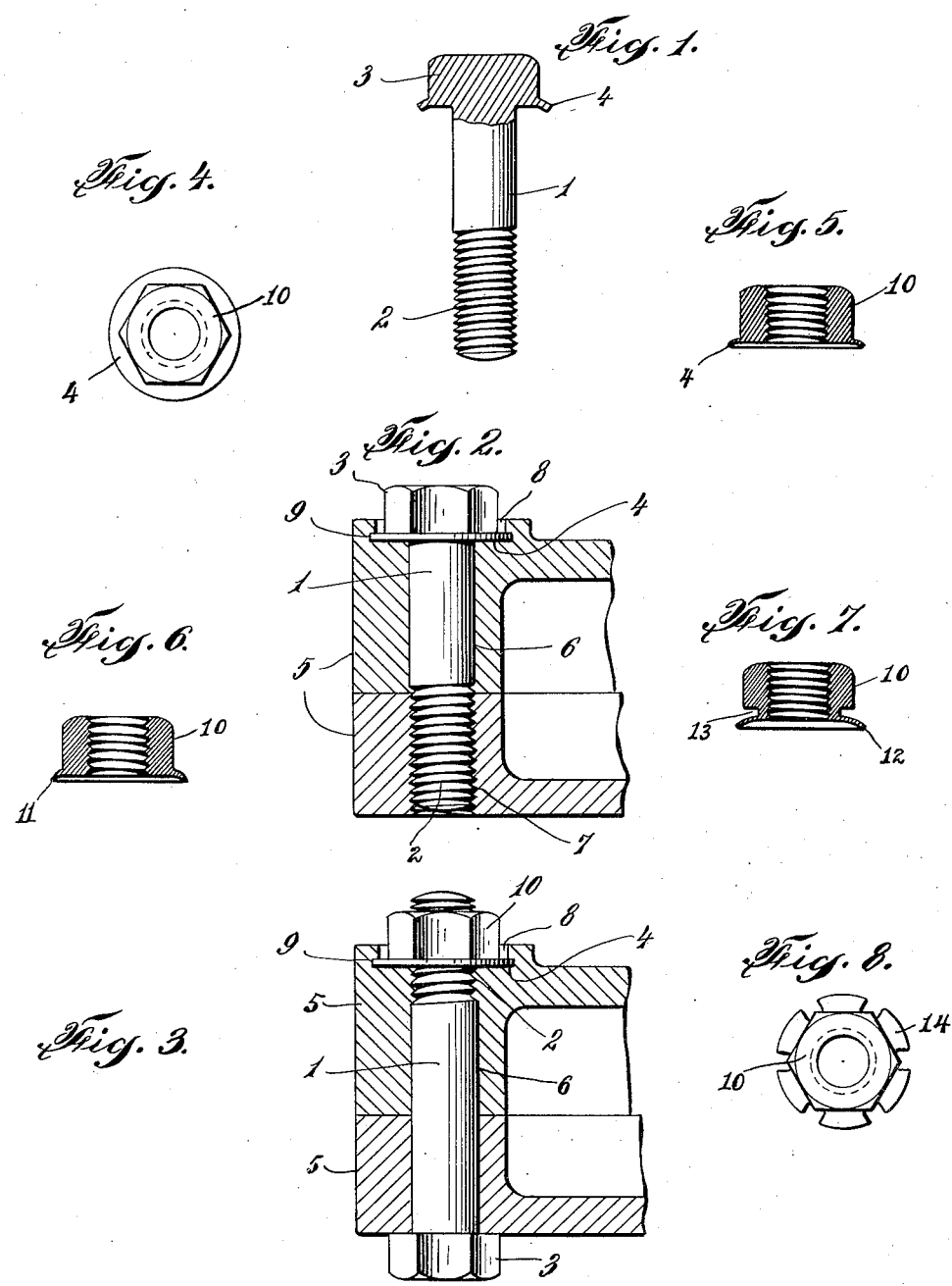

1,875,930

UNITED STATES PATENT OFFICE

JOHN F. MARTIN, OF SPRINGFIELD, MASSACHUSETTS

SELF-LOCKING NUT AND SCREW

Application filed February 26, 1931. Serial No. 518,483.

This invention relates to improvements in nuts and bolts, particularly means for locking nuts and bolts when used to fasten two or more members together.

An object of this invention is to provide locking means for holding a fastening element such as a nut or a bolt in operative position without any added separable devices to cooperate with the nut or bolt to bring about the desired result.

A further object is to provide locking means involving no adjuncts to the nut or bolt to be secured, and necessitating at most but a small change of form in one or the other; but nevertheless easy to operate, efficient and firm and certain in its effect.

Another object is to provide locking means that is automatic, coming into play of itself when the nut or bolt is made tight in its proper place.

A still further object is to provide locking means that is simple in design, is an integral part of the fastening element, requires no material alteration in the structure thereof, and is inexpensive to make.

These and other objects and advantages of the invention are more fully set forth in the following description, taken with the accompanying drawing on which several embodiments are illustrated; but the disclosure is by way of example only, and variations in details may be adopted without departing from the principle or exceeding the scope and spirit of the invention, as indicated by the broad and general meanings of the terms in which the appended claims are expressed.

In the drawing,

Fig. 1 is a side view of a bolt to be locked according to the invention; Fig. 2 shows the same bolt holding two members together and locked fast; Fig. 3 shows a nut serving the same purpose; Figs. 4 and 5 show in plan and section respectively the same nut before locking; Figs. 6 and 7 are sectional views of modified forms of lock nuts; and Fig. 8 is a top view of another type of lock nut.

The same numerals identify the same parts throughout.

In the particular description of the drawing, a bolt is shown in Figs. 1 and 2, with a stem or shank 1, bearing threads 2, and with a head 3 at one end. The stem 1 extends from one face of the head 3, and the head has a circumferential projection in the form of a collar or flange 4, flush with this face and shaped so that it is bent or curved over slightly towards the stem 1, making this face slightly cupped. This circumferential collar is not very wide and sufficiently thick to be able to resist any shearing stresses to which it may ordinarily be subjected.

The members to be secured by the bolt are indicated at 5. They are bored to provide holes 6, one or both of which may have the internal threads 7 to mesh with the threads 2. One of these members which is to abut the head 3 has a shallow recess 8, of a diameter slightly greater than the diameter of the collar 4 as shown in Fig. 1; and the sides of this recess may be undercut, if preferred, in the plane of the bottom, to provide the groove 9. This groove may be of about greater width as the thickness of the collar 4, so that the collar may easily be expanded into the groove 9. Of course the groove 9 need not extend all the way round the side of the recess 8; instead it may be made shorter if desired and may even be given the form of a mere indentation of greater or less length, and the term groove or slot is to be understood accordingly.

To cause the locking means to take effect, the bolt is merely screwed home into the holes 6, drawing the members 5 together. As the bolt is tightened, the head 3 passes farther and farther into the recess 8 till the collar 4 comes into contact with the bottom thereof. Further rotation now screws the bolt home and forces the flange 4 against the bottom of the recess 8, bending the flange outward. That is, the collar 4 has its lower or inner face flattened against the bottom of the recess 8, expanding or spreading the collar and causing it to enter the groove or slot 9. The collar is made of the same quality of metal as the head 3. Hence the deformation or expansion thereof is permanent; once it is forced into the slot 9 it stays in place, and turning the bolt in the opposite direction in consequence of jars, shocks, etc., by which the bolt may ordinarily be loosened, is quite effectively prevented. Of course the bolt might still be taken out with a tool if enough force is exerted to put the flange 4 out of the slot 9 and bend it as it was in the beginning; but the loosening of the bolt otherwise is rendered impossible.

Thus the bolt is securely locked without requiring any washers or other extra elements, and without any radical changes in its form or design. The locking means is exceedingly simple, inexpensive and sure in its action, and no additional labor is required, because the locking is done automatically and by the same manipulation that puts the bolt into operative position.

Instead of producing the bolt with the flange or collar 4 on the head 3, the same expedient may be employed with a nut, as shown at 10 in Figs. 3, 4 and 5. Here the nut has the flange 4, and the head 3 will fit against one of the members 5 which has no recess while the nut 10 will be screwed upon the threaded stem 1 and turned up till it enters the recess 8 in the other. The flange 4 thereon is thus forced as before into the groove 9 and the loosening or displacement of bolt and nut is prevented as before, except with a tool manipulated powerfully enough to rip the collar out of the slot which has received it.

The groove 9 can be omitted, and the nut or bolt can be made of material harder than the members 5 to be held together. Then the flange 4 will cut its own groove in the recess 8 as the nut or the bolt is made tight.

As shown in Fig. 6, the nut (or the bolt head) may have the flange 4 thereon tapered to an edge 11. This edge will cut into the side of the recess 8 more effectively when there is no slot or groove 9, to afford the locking action. This flange will be bent as before away from the plane of the adjacent flat face of the nut or bolt, so as to make this face cup-shaped as above-described.

In Fig. 7 is illustrated a nut (or bolt head) with a flange 12 and cupped face, and a circumferential groove 13, giving the flange greater width and rendering it more flexible.

Fig. 8 shows a nut (or bolt head) with the flange cut at several points into sections 14 to make the flange more flexible and enable it to bite into the side of the recess 8 at the bottom more easily.

In all forms of locking means herein set forth, the action is quite automatic, and takes place when the nut or bolt is made tight. The recess 8 of the one member 5 can be cut to provide the slot 9 or not, as desired, because, if the nut or bolt head as the case may be with the flange is made harder than the member, the flange will cut into the sides of the recess and the bolt or nut will be held as tightly as if the slot were present.

Having described by invention, what I claim is:—

1. The combination of a recessed member to be held fast, a rotatable fastening element having an integral laterally extending projection, said member having a recess to receive therein said projection, said projection being initially turned towards the axis of said element but extending radially therefrom a distance smaller than that between the center and the periphery of said recess, the projection engaging a surface in the recess when said element is tightened by rotation and the end of said projection being then forced outward a greater distance from the axis of said element to engage the inside of the recess and hold said element in place.

2. The combination of a member having a recess with a slot therein to be held fast to another member, a rotatable fastening element having a projection for enabling the fastening element to hold said members, the projection being initially bent towards the axis of said element to enter said recess and expansible to enter the slot to prevent loosening of the fastening members, said recess being so shaped that said projection is forced against a surface thereof and expanded into the slot by the action of said element as the latter is rotated into fastening position.

3. The combination of members to be held fast, one of said members having a recess with a surrounding slot adjacent the bottom thereof, and a rotatable fastening element having a collar initially bent towards the axis of said element to restrict its diameter so that it may enter said recess, said collar being deformable against a surface in said recess by the action of the fastening element as the latter is tightened by rotation to hold the members to enable the collar to be expanded and forced into the slot to secure the fastening element against loosening.

4. The combination of a rotatable fastening bolt having a head with a flange adjacent the face from which the stem of the bolt projects, and a member to be held fast by the bolt, said member having a shallow recess of a diameter slightly larger than the initial diameter of the flange, the flange being deformable and initially bent towards the stem of the bolt, the head of the bolt entering the recess when the bolt is screwed in place and the flange being expanded against a surface of the recess by action of the bolt as it is tightened by rotation to prevent loosening thereof.

5. The combination of a fastening bolt having a head, a pair of members having holes to receive the bolt, threads on the bolt, and a rotatable nut to engage the end of the bolt, the nut having a peripheral flange adjacent one end, said flange being initially bent towards the axis of the nut to restrict its initial diameter, one of said members having a recess around one end of the hole therethrough, said recess being large enough to receive the nut with the flange thereon, the nut when screwed tight causing the flange to abut against a surface of the recess and to expand and bind the nut in position.

6. The combination according to claim 4, wherein the recess in said member has a circumferential slot to receive the flange.

7. The combination according to claim 5, wherein the recess in said member has a circumferential slot to receive the flange when the nut is tightened.

In testimony whereof I affix my signature.

JOHN F. MARTIN.